(No Model.)
W. MARSHALL.
FRUIT PARING AND CORING MACHINE.
No. 427,337.  Patented May 6, 1890.
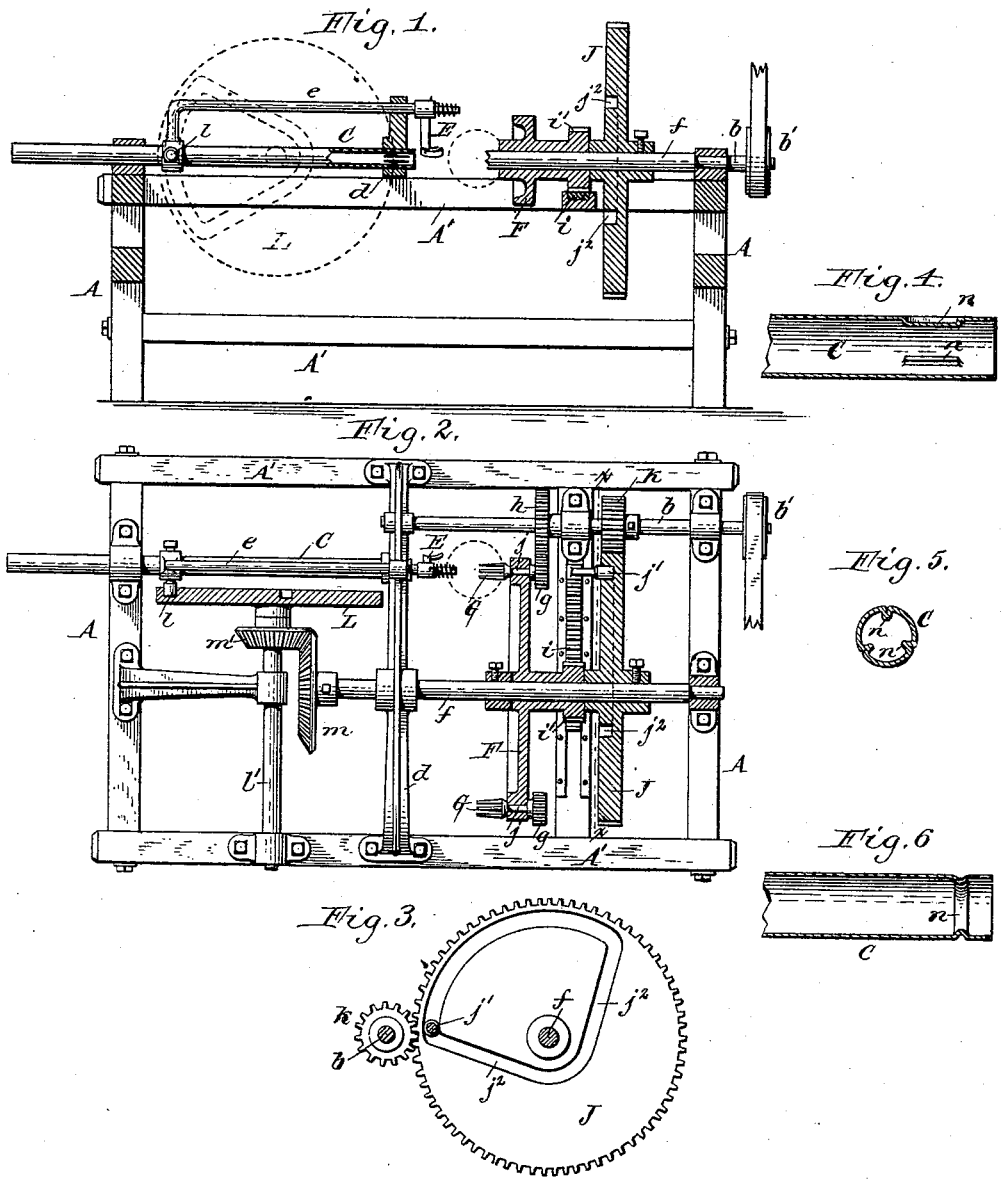

UNITED STATES PATENT OFFICE.

WILLIAM MARSHALL, OF DUNNVILLE, ONTARIO, CANADA.

FRUIT PARING AND CORING MACHINE.

SPECIFICATION forming part of Letters Patent No. 427,337, dated May 6, 1890.

Application filed May 23, 1889. Serial No. 311,857. (No model.)

*To all whom it may concern:*

Be it known that I, WILLIAM MARSHALL, a citizen of Canada, and a resident of Dunnville, in the Province of Ontario, Canada, have invented new and useful Improvements in Fruit Paring and Coring Machines, of which the following is a specification.

This invention relates to that class of fruit paring and coring machines which are provided with an automatic delivery mechanism, whereby the fruit is presented to the paring and coring devices, and in which two or more fruit-forks are employed, one of which is actuated while the others remain at rest, so that the fruit may be applied to the idle fork or forks while the active fork is in motion, and thereby enable the machine to work without interruption.

The object of my invention is to simplify and improve the fruit-delivery mechanism, and also to construct a reliable coring device which will remove the core from the fruit-fork after the fruit is pared and the core cut.

My invention consists to these ends of the improvements which will be hereinafter fully described, and pointed out in the claims.

In the accompanying drawings, Figure 1 is a vertical longitudinal section of my improved machine. Fig. 2 is a horizontal section thereof. Fig. 3 is a cross-section of the machine in line $x$ $x$, Fig. 2, with the frame thereof removed. Fig. 4 is a fragmentary longitudinal section of the coring-tube on an enlarged scale. Fig. 5 is a cross-section thereof. Fig. 6 is a modified construction of the coring-tube.

Like letters of reference refer to like parts in the several figures.

A A represent the end frames, and A' the longitudinal-connecting pieces, of the machine.

$b$ is the main driving-shaft arranged lengthwise of the machine and mounted in bearings secured to the frame, and $b'$ is the driving-pulley secured to the shaft.

C represents the movable coring-tube, which slides with its rear portion in a bearing secured to the adjacent end frame A, and with its front portion in a bearing arranged in a cross-piece $d$, secured to the longitudinal pieces A'.

E is the paring-knife arranged in advance of the coring-tube C on one side thereof, and attached to a supporting arm or bracket $e$, secured to the coring-tube, so as to move back and forth with the tube. The paring-knife may be of any ordinary construction.

F represents an oscillating fork-carrying frame, arranged in front of the paring and coring devices, and turning loosely upon a longitudinal shaft $f$, journaled in suitable bearings secured to the frame of the machine.

G G represent the rotating fruit-forks mounted on short shafts $j$, journaled in the end portions of the fork-carrying frame, and which are so arranged that either fork will stand in front of the paring and coring devices by properly turning the fork-frame. The shaft of each fruit-fork is provided with a gear-pinion $g$, which is adapted to mesh with a gear-wheel $h$, mounted on the driving-shaft $b$. Either fork is actuated by giving the carrying-frame a half-turn, so as to bring either pinion $g$ in engagement with the driving-gear $h$.

$i$ represents a reciprocating rack-bar arranged transversely underneath the shaft $f$, and $i'$ is a pinion formed with or secured to the hub of the oscillating carrying-frame F and meshing with the rack-bar $i$. The latter is guided in suitable ways secured to a cross-piece of the machine, and is actuated by a lateral pin or projection $j'$, secured to the rack-bar and engaging in a cam-groove $j^2$, formed in the side of a cam-wheel J, secured to the shaft $f$. This cam-wheel is rotated continuously by a pinion $k$, secured to the main shaft $b$ and meshing with the teeth of the cam-wheel. The cam-groove $j^2$ consists of two concentric portions and two straight radial portions, which unite at their outer ends with the extremities of the concentric portions, forming a sector-shaped groove, as represented in Fig. 3. The radial portions of the cam-groove cause the pin $j'$ to shift the gear-rack $i$ alternately in opposite directions by the revolution of the cam-wheel, while the concentric portions of the groove do not shift the rack-bar, but allow it to remain at rest for a short period at the end of each stroke. The reciprocating movement of the rack-bar $i$ causes the pinion $i'$ to give the fork-carrying frame F a half-turn alternately and intermittently in opposite directions, whereby the fruit-forks are alternately thrown into gear with the actuating-wheel $h$. The fork-carrying frame is arrested for a sufficient time at the end of each movement to finish paring and coring the fruit on the active fork and to enable the attendant to place the unpared fruit on the idle fork. The coring-tube and the paring-knife are given an intermittent reciprocating movement toward and from the fruit-forks by means of a pin or projection $l$, secured to the coring-tube and engaging in a cam-groove formed in a gear-wheel $L$, secured to a transverse shaft $l'$. The movement of the coring-tube and paring-knife is timed relatively to that of the fork-carrying frame, so that the coring-tube and knife will advance at the moment that either fruit-fork stands in the path thereof. The transverse shaft $l'$ is suitably supported and is driven from the longitudinal shaft $f$ by bevel-wheels $m\ m'$.

The coring-tube is open at both ends and provided at its front end with an annular cutting-edge, in the usual manner.

$n$ represents an annular series of lugs, ribs, or projections arranged longitudinally in the bore of the coring-tube, at or near the front end thereof, preferably at equal distances apart. These ribs embed themselves in the body of the core as the coring-tube cuts into the fruit and increase the frictional contact between the severed core and the tube, thereby assisting in holding the core in the end of the tube and causing the core to be removed from the fork when the coring-tube recedes. The cores are discharged from the rear end of the coring-tube by the fresh cores, which successively enter the tube and push the previous cores through the tube. The ribs or projections $n$ are preferably formed by indenting the outer surface of the coring-tube, as shown in Figs. 4 and 5.

The pared fruit which is removed from the fruit-forks by the receding coring-tube is stripped from the latter by striking the cross-piece $d$ in a well-known manner.

Instead of the longitudinal ribs $n$, a transverse annular rib may be employed, as represented in Fig. 6. In this case a portion of the outer surface of the core is compressed by the annular rib as the coring-tube enters the fruit and the portion of the core in rear of the rib expands after the rib has passed said portion, and thereby confines the severed core in the tube.

I claim as my invention—

1. The combination, with a driving-shaft having a gear-wheel, of an oscillating fork-carrying frame provided with a gear-wheel, fruit-forks journaled in said carrying-frame, and each provided with a gear-pinion adapted to engage with the gear-wheel of the driving-shaft, a movable gear-rack engaging with the gear-wheel of the fork-carrying frame, and a cam-wheel whereby said gear-rack is actuated, substantially as set forth.

2. The combination, with a driving-shaft having a gear-wheel, of an oscillating fork-carrying frame provided with a gear-wheel, fruit-forks journaled in said carrying-frame, and each provided with a gear-pinion adapted to engage with the gear-wheel of the driving-shaft, a movable gear-rack engaging with the gear-wheel of the fork-carrying frame and provided with a pin or projection, and an actuating-wheel provided with a cam-groove in which the pin of the gear-rack engages, substantially as set forth.

3. The combination, with a driving-shaft having a gear-wheel, of an oscillating fork-carrying frame provided with a gear-wheel, fruit-forks journaled in said carrying-frame and provided with pinions engaging alternately with the gear-wheel of the driving-shaft, a reciprocating gear-rack engaging with the gear-wheel of the fork-carrying frame and having a pin or projection, an actuating-gear having a cam-groove in which the pin of the rack-bar engages, and a gear-wheel mounted on the driving-shaft and meshing with said cam-wheel, substantially as set forth.

4. A corer consisting of a tube provided with an indentation forming an internal rib or projection which holds the severed core in the tube, substantially as set forth.

Witness my hand this 25th day of April, 1889.

WILLIAM MARSHALL.

Witnesses:
T. A. SNIDER,
THOS. MARSHALL.